(12) United States Patent
Dattatri

(10) Patent No.: US 6,658,453 B1
(45) Date of Patent: Dec. 2, 2003

(54) SERVER AGENT SYSTEM

(75) Inventor: Kayshav Dattatri, San Jose, CA (US)

(73) Assignee: America Online, Incorporated, Dulles, VA (US)

( * ) Notice: Subject to any disclaimer, the term of this patent is extended or adjusted under 35 U.S.C. 154(b) by 0 days.

(21) Appl. No.: 09/321,646

(22) Filed: May 28, 1999

Related U.S. Application Data

(60) Provisional application No. 60/086,996, filed on May 28, 1998.

(51) Int. Cl.$^7$ ............................................. G06F 13/00
(52) U.S. Cl. ...................... 709/202; 709/203; 709/217; 709/224
(58) Field of Search ................................. 709/202, 203, 709/217, 219, 224, 229, 223, 200, 201, 218

(56) References Cited

U.S. PATENT DOCUMENTS 5,721,825 A * 2/1998 Lawson et al. ............. 709/202

(List continued on next page.)

FOREIGN PATENT DOCUMENTS

| WO | WO 96/23265 | 8/1996 |
|---|---|---|
| WO | WO 99/05593 | 2/1999 |
| WO | WO 99/21108 | 4/1999 |

OTHER PUBLICATIONS

Hidekazu Sakagami, et al; *Effective personalization of push–type systems—visualizing information freshness*; Apr. 1, 1998; Computer Networks and ISDN Systems; vol. 30, No. 1–7.

Barbara B. Packard and Charles H. Whelen; An *Extensible Agent Task Language*, 1989, Hewlett–Packard Journal.

*Primary Examiner*—Moustafa M. Meky
(74) *Attorney, Agent, or Firm*—Glenn Patent Group; Michael A. Glenn; Kirk D. Wong

(57) ABSTRACT

A server agent system that provides agents, transmitted to a server by a client, that monitor specific event(s) on the server. When a pre-defined event(s) occurs, an agent performs a set action(s) in response to each event. The actions are predefined by the client. The agent requires no further intervention of the client once it is placed on the server and are created by a client or news reader and, when created by a news reader, agents are treated as a value added service provided by the application. The types of actions that an agent performs can be almost anything that the client desires and include the execution of Java and/or Javascript programs which are supplied by the client or the server. An agent's events and actions are subject to the same access control security restrictions as the client that submitted the agent. The types of agents available on a server are predefined and are supplied as agent templates and are building blocks for the client to build agents with. A server can only supply agents that it understands and publishes the available agent templates and events on an agent home page where clients select from the list of agent types available on the server and submit an agent to the server. Servers also provide administration services for clients with resident agents where they monitor and manage their agents on the server. Each agent is assigned a unique identifier and token by the server. Names can also be assigned to an agent by the client. Server administrators are provided with an administration function to maintain and manage agents resident on that server. Agent objects are created on the server that uniquely identify that agent which is mapped to the proper event and is triggered upon occurrence of that event. When the agent is triggered, its action list is processed, executed and agent information and statistics are logged.

63 Claims, 3 Drawing Sheets

U.S. PATENT DOCUMENTS

| | | | | |
|---|---|---|---|---|
| 5,813,007 A | * | 9/1998 | Neilsen | 707/10 |
| 5,872,931 A | * | 2/1999 | Chivaluri | 709/223 |
| 5,944,782 A | * | 8/1999 | Noble et al. | 709/202 |
| 5,946,464 A | * | 8/1999 | Kito et al. | 709/202 |
| 5,978,566 A | * | 11/1999 | Plank et al. | 709/206 |
| 6,055,570 A | * | 4/2000 | Nielson | 709/224 |
| 6,057,841 A | * | 5/2000 | Thurlow et al. | 345/347 |
| 6,065,044 A | * | 5/2000 | Ogaswara | 709/207 |
| 6,094,681 A | * | 7/2000 | Shaffer et al. | 709/224 |
| 6,151,623 A | * | 11/2000 | Harrison et al. | 709/206 |
| 6,154,843 A | * | 11/2000 | Hart, Jr. et al. | 713/201 |
| 6,167,441 A | * | 12/2000 | Himmel | 709/217 |
| 6,185,613 B1 | * | 2/2001 | Lawson et al. | 709/224 |
| 6,401,113 B2 | * | 6/2002 | Lazaridis et al. | 709/207 |

* cited by examiner

SERVER AGENT SYSTEM

This application claims the benefit of Provisional Application No. 60/086,996 filed May 28, 1998.

BACKGROUND OF THE INVENTION

1. Technical Field

The invention relates to client-server interaction in a computer environment. More particularly, the invention relates to the creation and operation of agents for asynchronous client-server transactions in a computer environment.

2. Description of the Prior Art

Webserver users have had difficulty with keeping track of the contents of a webserver. Currently, if a user is waiting for updates to a document on a website, then he must periodically visit the website (hosted on a webserver(s)) to examine the document. There is no automatic method for letting a user know when a document is updated. This forces users to frequently visit servers which causes increased network traffic, higher loads on the server, slower response times, and inconvenience to the users.

Additionally, users sometimes require periodic reminders or need to perform certain tasks periodically, e.g., sending an email to someone on their birthday. User tasks may be highly time critical. Web Servers currently have no way of performing such tasks. This is because a Web Server is passive and performs tasks only when a user is connected to it.

None of the current Web Servers have solved this problem elegantly. They require the user to periodically poll a website. This places the burden on the user to remember important dates and, if the user forgets a date, he will miss the important tasks associated with that date. As mentioned above, the current approaches cause an increase in network traffic, higher loads on the Web Server, and have no way to automate routine tasks.

It would be advantageous to provide a server agent system that intelligently monitors a server for certain events. It would further be advantageous to provide a server agent system that allows a client to easily create an agent that performs operations specified by the client in response to these events without any further involvement from the client.

SUMMARY OF THE INVENTION

The invention provides a server agent system. The system asynchronously monitors events that occur on a server that are specified by a client. The server performs actions in response these specific events. In addition, the invention provides a system that allows the user to easily create and maintain the agents that perform the monitoring services.

A preferred embodiment of the invention provides agents, transmitted to a server by a client, that monitor specific event(s) on the server. When a pre-defined event(s) occurs, an agent performs a set action(s) in response to each event. The actions are pre-defined by the client.

The agent requires no further intervention of the client once it is placed on the server. The type of events that an agent can perform are specified by the host server.

Agents are created by a client or news reader. When created by a news reader, agents are treated as a value added service provided by the application.

The types of actions that an agent performs can be almost anything that the client desires and include the execution of Java and/or Javascript programs. The Java and/or Javascript programs are supplied by the client or the server. An agent's events and actions are subject to the same access control and security restrictions as the client that submitted the agent.

Email is used to send notifications from a server to a client, confirming that an agent submitted by a client to the server was received. The email facilities are diverse such that the client can also specify that an email notification be sent to a group of clients. Email notification is also used by servers to notify a client that an agent has expired.

The types of agents available on a server are pre-defined. These pre-defined agents are supplied as agent templates and are building blocks for the client to build agents with. A server can only supply agents that it understands. Servers publish the available agent templates and events on an agent home page. Clients select from the list of agent types available on the server and submit an agent to the server.

Servers also provide administration services for clients with resident agents. Clients monitor and manage their agents on each server. Each agent is assigned a unique identifier and token by the server. Names can also be assigned to an agent by the client. Server administrators are provided with an administration function to maintain and manage agents resident on that server.

Agent objects are created on the server with a unique identify. The agent is then mapped to the proper event and is triggered upon occurrence of that event. When the agent is triggered, its action list is processed. The actions are executed and agent information and statistics are logged.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a server agent system in a computer environment. A system according to the invention provides a method for asynchronous transactions between a server and a client. In addition, the invention provides a system that allows the user to easily create and monitor agents performing the asynchronous transactions.

Figure 1:
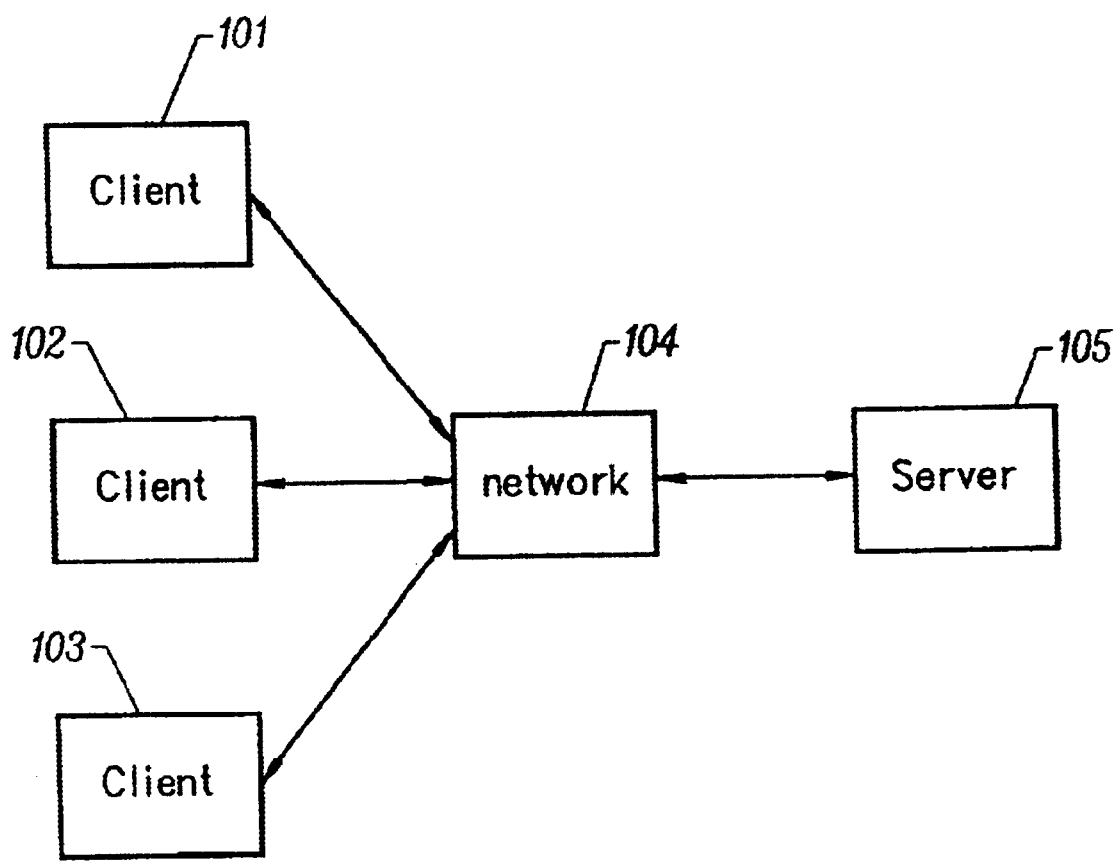
FIG. 1 is block schematic diagram of the client-server interaction over a computer network according to the invention.

Referring to FIG. 1, a preferred embodiment of the invention allows a client 101 to create and monitor agents placed on server 105 across a computer network 104 such as the Internet or an intranet. These agents monitor specific asynchronous events on a server 105 and perform user specified tasks in response to these events, e.g., e-mailing a reminder message to the client on a certain date.

A client can only view documents on a server across a computer network using traditional server products. The server provides services only as long as the client is connected to the server. In other words, the client-server transactions are synchronous. However, in many situations, it would be desirable to have an asynchronous server response.

It would be very helpful if the server could notify (using some mechanism) the client upon occurrence of an event. For example, a client can request notification from a library (server) when a specific book is available for checkout or a client can request a phone call from an airline ticket server when a seat becomes available on a particular flight. These are examples where the response from the server is asynchronous. There are two distinct phases in this scenario:

1. A client requests that the server perform some actions when a specific event occurs; and
2. The server keeps track of the client's request and performs the actions when the event occurs.

In general, there is an event and an associated action(s). A main feature of the invention is that, after the client requests the server to monitor events and execute actions, the server takes over the responsibility of ensuring service. The client does not have to remain connected to the server.

The event/action combination is called an agent object. The server monitors events and triggers the actions when the desired event occurs, on behalf of the client. In other words, the server acts as an agent of the client with respect to the event/action.

A client creates agent objects and hands them over to the server. The event/action combination resides on the server as an agent of the client. An agent object provides service to the client but the agent is managed, monitored, and controlled by the server. The term server side agent is also used to describe an agent.

The term "agent" is highly overloaded. There are different meanings attached to it. Autonomous agents are programs that travel between sites, deciding by themselves when to move and what to do. These can only travel between special servers and are currently not widespread in the Internet.

Intelligent agents are programs that help users with things, such as choosing a product, or guiding a user through form filling, or even helping users find things. These have generally little to do with networking.

Much of the work with agents is in the artificial intelligence area (learning agents) which do not have anything to do with Web agents. Web agents are small entities that allow a client to specify actions to a server that must be executed in response to an event.

Agents are also viewed as mobile programs that move from machine to machine, gathering/learning information. An agent is also seen as a small program that works on huge amounts of data. Instead of moving the data from different locations to the agent site, the program moves to the data site. The cost of moving the program (agent) from one site to another is trivial. This is the rationale behind web crawlers. A typical example is an agent that moves from one site to another looking for the best deal on a vacation package.

An agent as used in this document is an object that contains an event and action(s). Both events and actions can be implemented as complex programs. What an agent can do is completely up to the programmer implementing it.

The invention provides the necessary tools to manage agents from the client side. Agents are described in this document as objects that require services from the server but are created by clients. In other words, the agent is interested in things (events) happening on the server(s) and it executes on behalf of the client on the server.

One skilled in the art will readily appreciate that although the description herein focuses on agents on the server side, agents can also reside on the client side and be defined by a server or possibly another client.

Anatomy of an Agent

As described above, an agent object has two parts—an event and a set of actions. An event is something that triggers the actions. It could be as simple as a specific time (e.g., Monday, Mar. 4, 1996 at 9 AM) or a logical combination of things (e.g., seat on flight X is available, and a seat on the connecting flight Y is also available, and accommodation in hotel H is available).

An event can also be a recurring event (e.g., every alternate Tuesday at 6:30 PM). Such recurring events could lead to an agent that never terminates (i.e., it can only terminate when the client who created it requests to do so). Ideally, any type of event that a client is interested in is supported.

An action, or a set of actions, is anything that a client wishes to do when the specific event occurs. The action can be as simple as sending an email message to the client or it can be a series of actions (e.g., make reservations on flight X and Y, book a room in hotel H, book a car with Speedy car rental, send a message to friend F asking for a ride to airport, send a message to newspaper agency asking them to suspend delivery of paper, etc.). An action can involve the placing of a telephone (or pager) call to the client informing him that funds have been deposited into his Swiss bank account. A more complex action can ask the server to execute a Java program (or a JavaScript script) that was submitted by the client when the agent object was created.

Agents are not guaranteed to get triggered some time in the future when they are submitted. It is possible that the event that the agent is waiting on will never occur. For example, if an agent is waiting on modifications to a file, but the file is deleted, then the event can no longer happen. This causes the expiry of the agent (abnormal termination). The owner of the agent receives a notification indicating such failures.

Creating Agents

Clients need a way to specify events and actions. Creating an agent involves the specification of the event and the associated action(s). This is like writing a small program that checks for events. A set of standard agent templates is provided by the invention that clients can use with little or no modifications. For example, an agent that monitors changes to a Web page is a standard template. An agent that gets triggered on a time event is another standard template. In most cases, clients modify these template agents and are done with it.

Facilities are also provided by the invention to create sophisticated agents for those clients whose needs are not met by the template agents.

The next step is that of transferring the agent object to the server. Once the agent object has been successfully transferred (or transmitted) to the server and validated by the server, the client can rest assured that the requested service will be done (except in cases where some catastrophic event prevents the server from fulfilling its responsibilities). Note that a server crash does not imply the loss of agent objects because agent objects are persistent.

Types of Events

An agent can be triggered by different types of events. Some are simple time events and others are complex events generated by relational databases. The following is an example of a list of possible event types:

Time related Events

Trigger at a specific date and time.

Trigger periodically (recurring event).

Trigger if the date is X and day is Y.

Trigger if the date is X, day is Y and it is an even (or odd) month.

Document related events

A new document of a certain type is created on the server.

A new version of a specific document is created on the server.

A new document by a certain user is created.

A document is deleted.

A document is moved or renamed.

A specific document is modified on the server.

A specific document is accessed by a certain user.

A specific user accesses any document on the server.

A specific user modifies a document on the server.

A document of a specific type is created on the server.

Administration events

These agents are useful to administrators of servers. An agent can look for access by a specific user, a specific user disconnecting, low disk space, log file size, etc. Server writers and server administrators provide ways to detect events. Users are allowed to register for events published by the server. Server administrators (who have full control over the server) are free to add and publish new events.

Program detected events

A sophisticated user might submit a Java/JavaScript program to detect events and trigger the agent. Again, a user would not be allowed to submit any Java program as part of an agent. Servers provide specific Java/JavaScript programs that clients can use in their agents. The available set of such Java/JavaScript programs are determined by the server administrator.

In general, clients have the capability to detect any event, subject to authorization and access control. The agent framework provides direct services to detect events or the framework enables service access points that clients can use to detect interesting events by writing Java/Javascript programs. Agents can only register for events published by a server. Clients are not able to register for any arbitrary events. This is because every server provides a different kind of service and the server writers decide which events are available from their server(s).

Every server that allows agents to run, publishes the complete set of events that an agent can use. This makes it possible for server administrators to have full control over what events are detectable by agents. The types of events that are made available are only limited by the server writer and not the agent framework. The agent framework, by default, provides a basic set of events that are most common among servers (such as those described above).

Figure 2:
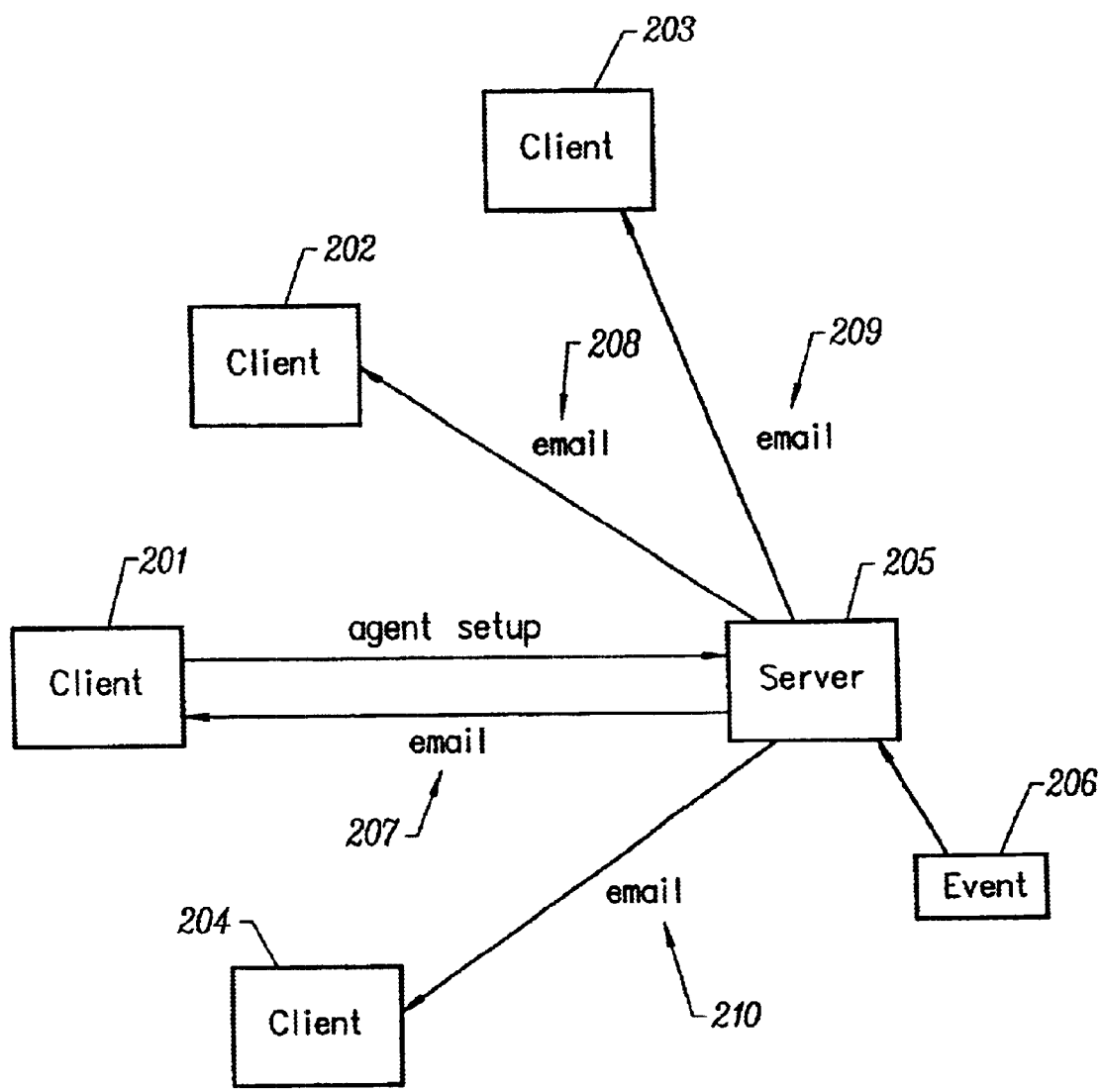
FIG. 2 is a block schematic diagram of a server performing an action in response to an event according to the invention.

With respect to FIG. 2, clients can specify a combination of any of these events. For example, a client 201 can specify "if document A is modified before Jan. 1, 1997 send me mail." When the event 206 occurs, i.e., document A has been modified before Jan. 1, 1997, the agent then causes the server 205 to send an email message 207 to the client 201. The client could have also specified that email messages 208, 209, 210 be sent to several clients 202, 203, 204.

Types of Actions

This is really up to the client's imagination, because a client can write a Java/JavaScript program to do whatever they want (subject to access control). But for most clients, at the minimum, the following examples of types of actions should be provided:

Send a mail message to a specified user(s) with specified contents.

Initiate a telephone call, page, (or send a fax) to a specific user (assuming that the server has access to telephone/fax).

Post a new message on a newsgroup.

Log an entry in a database (or a log file).

Post to a web page.

Send a HTTP notification.

Submit another agent to run on the server.

Execute a server supplied Java/JavaScript program when triggered.

SNMP actions.

Sending an email message, fax, page, etc., all require similar Application Programming Interfaces (API) on the server.

As with events, clients can do anything in response to a trigger. The agent framework provides services that clients can use to do anything they prefer.

The available set of actions on a server is controlled by the server writer/administrator. An agent can only perform those actions that are supported by the server. The agent framework provides the necessary API for server writers to implement their specific actions. Most general actions (like sending a mail message, posting to a web page) are part of the base agent framework.

Managing Agents—the Client's View

Once agents are created and transferred to a server, facilities are needed to control them (disable, remove, copy, list, etc.). A client may wish to review the list of all agents created by him. Similarly, on the server side, facilities are needed to manage all of the agents resident on that server. The following paragraphs focus on the client's perspective.

Creating Agents

Every server supports a pre-defined set of agent types called agent templates. They are analogous to a class in any object-oriented language. Clients must create an instance of one of the templates and submit it to the server. Any instance of an agent submitted by a client runs on the server on behalf of the client. To make this easy, every server supporting agent services provides an agent home page.

The agent home page describes all of the different agent templates available on that server and is basically a forms interface. Complete details of every agent template is available (including textual description) in this page. Clients can navigate this page, create an instance of one of the agent templates and submit it to the server. To further ease the process of creating agent instances, a server can group the agent templates into different categories (document related, time related, SNMP related, operating-system related, database related, etc.). Clients can navigate the hierarchical list of agent templates.

Creating Context-sensitive Agents

Some clients might not go to the agent home page to create agents. Consider a news server that supports agent services. A client can create an agent that will notify the client when a new article is added to a particular thread in a specific newsgroup. The client may not know anything about the home page.

To facilitate application specific (or context specific) agents, the Meta (or services) menu in a Web browser can be used. The Meta menu is used for accessing document meta information. Agents are treated as a meta facility (a value added service provided by the application) that document writers might support.

For example, the news reader would add a menu item in the Meta menu that allows the client to create an agent as mentioned above. By selecting this menu option, the application (news reader) creates an instance of an agent template and submits it to the server (after confirmation by the client). This enables clients to submit agents in the context of their application.

Application writers are expected to make use of this facility extensively. It is assumed that, sooner or later, most of the agents will be created this way. This also allows content providers to offer agent services without the clients doing or knowing anything about agents.

Agent Editing

As with anything else in software, it is not good enough to be able to create agents. Facilities for modifying and saving agents are also needed. For example, a client might create an agent for notification at a specific meeting time. But later he might want to change that notification time. It should be possible to name agents (an agent id) so that the name can be used by a client to identify the agent. The naming scheme uses the client's name and server name to make the agent ids unique across client-server pairs (tuples). This is one type of agent editing where an existing agent is modified and resubmitted.

Clients may also want to save a copy of an agent before submitting to the server. For example, a client may create time notification agents for different times. Instead of going through the operation many times, he could just create one agent, make copies of it, modify the time component, and submit them to the server.

Any client submitting an agent receives a confirmation about the agent submission from the server via email. In other words, a client must have an email address to use agent services. The mail message provides details about the name of the agent (agent identification), time created, etc. Clients must use their mail clients (mail filters) to handle such confirmations.

E-mail is used as the communication channel to ensure site independence and mobility. Users can access details about their agents from anywhere, provided they have access to their email accounts. A client submitting an agent may also specify that the confirmation be sent to an entire group. If the confirmation message sent by the server is lost, then the user must submit another agent. Loss of the confirmation message does not imply that the agent itself was not accepted by the server. It just indicates that the client did not receive the confirmation put out by the server.

Clients can pick any name they like for their agents. The server generates a unique id for each agent submitted (somewhat like a URI). This agent id is sent to the client in the confirmation message mentioned above. Clients must use this id when they talk to the server regarding the agent.

The agent id will contain details about the agent (time/date created, usename, user address, etc.). The intention here is to map the agent id to a page on the server. A client is able to click on an agent id, bring up the information about the agent, and edit it. This makes the entire browser interface to agents uniform (clickable objects).

Clients are able to control/review the following data:

List of available agent classes (or categories)
List of agent instances outstanding
  By user
  By user group (subject to authentication)
  By organization (subject to authentication)
  By agent class
List of agents that were triggered
  By user
  By user group (subject to authentication)
  By organization (subject to authentication)
  By agent class
Delete an agent
Suspend an agent (not the same as deleting)
Resubmit an agent
Look at the statistics of an agent Clients that do not remember (or do not have access to) the agent id returned by the server, can use this mechanism to enumerate all of their agents. Even though this is a bit tedious for clients who have submitted numerous agents, it provides another way of accessing agent information.

Agent Management

Clients are able to view all of the agents submitted by them on a per server basis. It is easy for the client to remove an agent, suspend an agent, and enable an agent. When the agent object is suspended, it still remains on the server but it is not active (it is not listening to events). In other words, even if the event occurs, the agent is not triggered. Such dormant agents can be re-enabled and they become normal agents.

When an agent is removed, the server no longer knows anything about that agent object. It is physically removed (deleted) from the list of agents on the server. When (re) viewing agents, all relevant information about the agent (date/time submitted, number of times activated, date/time last modified, etc.) is available.

Managing Agents—Server View

Managing agents on the server is complicated. The server takes care of agent object persistence, agent information logging, error recovery in case of server failure, authentication of agent object, etc.

Agent Object Persistence

When an agent submitted by a client is active on a server, the clients are assured that the action will be performed. But what happens when the server crashes due to some condition (or what if it is shutdown by the administrator)? When the server is restarted, all agents that were active just before the server crashed, must be reactivated. This requires that the state of the agent be persistent. To recover agents from server crashes and such catastrophic events, the architecture will implement checksum and other error recovery schemes to guarantee agent persistence.

Agent Activity Logging

Servers log all important information about agent objects. The information includes the time when the agent object was submitted, time when the agent object was triggered due to an event, number of times the agent was triggered (in case of recurring event agents), etc. In addition, general information like the total number of agents submitted, number of agents that were triggered, number of agents that were deleted by clients, number of agents that expired, etc. are also available.

Agent Management

The issues surrounding agent management on the server side are quite similar to those on the client side. The server administrator should be able to suspend, enable, and terminate an agent. In all such cases, the originator of the agent should receive a notification about the operation with enough explanation of the action. For example, the agent may be terminated because it was consuming more resources (disk, memory, etc.) than allowed.

Servers should be allowed to impose limits on the number of agents that can be active at any time on the server, the number of agents per client that can be active, resource limits on agents, etc. Note that there might be a large number of agent objects that were submitted to a server but not all of them might be active.

Servers may also impose limits on the quality of service they provide. For example, servers might specify that time granularity is limited to five minutes. All these limits are configurable on a per server basis (server administration).

Server administrators have full control over agent activities on their servers. In addition to what a normal client can do (as mentioned above), a server administrator can:

View all agents on the server
  By user
  By status (expired, triggered, waiting to trigger, deleted by user)
  By agent template class to which the agent belongs
  By creation time
Delete, modify, and Suspend any agent
Restrict the activities of an agent
Restrict agents of a class
  By user
  By group
  By domain
  All
Disable/Suspend agent submissions by
  By user
  By group
  By domain
  All
Limit number of agents created
  By user
  By group
  By domain
  All
  Force manual triggering of agents
Agent Naming Just creating agents is not good without a way to name them. Both clients and servers need a naming facility. A client might ask a server(s) to terminate an agent by name. Similarly, the server might send a notification to the dient indicating the expiration of an agent. Agent names, as mentioned earlier, are very similar to URIs.

Security and Access Control Issues

Access control and security must be enforced with all aspects of agent activities. Agents submitted by clients are subject to access control on the server side. An agent is not allowed to access anything that the client who created the agent cannot access. This is probably the hardest thing to enforce. It is even more difficult with Java and JavaScript agents. There are many issues involved here.

Access control must be enforced on what event an agent can register for and what actions it can perform. This is verified before the agent is accepted by the server whenever possible. The agent is not allowed into the server if the access control checks on the events and/or the actions fail. Access control is also enforced with respect to agent creation and agent deletion. Not all clients are allowed to submit agents to a server. Similarly, an agent can be deleted only by authorized personnel. All such operations are subject to strict access control.

Even with all of the checks on access control, there is no guarantee that an agent will execute to completion when the event is triggered. Due to the dynamically changing nature of servers and the internet environment, the agent might fail access control checks when it executes due to the triggering of an event. The client is notified about such failures with the appropriate explanation.

Access control is also enforced with respect to viewing agents on a server. Clients are not allowed to view, let alone delete/modify, agents created by others unless they have been authorized to do so.

Server administrators are not able to examine agent objects unless they have been authorized to do so. An administrator is able to administer (enable, disable, etc.) agent objects on the server but he is not able to look into the events or actions contained in the agent.

If an agent instance is implemented as a URL, then security and access control are available for free.

When an agent is triggered, the specified action is performed. If the action involves sending a mail message to some address, the mail message will identify the creator of the agent (the client that submitted the agent) that caused the message to be sent.

Server API for Agent Development

As with any other server feature, programmers would like to write their own code to do wonderful things with agents. APIs are provided for agent programmers to harness the agent capabilities in a server.

Design of the Agent Subsystem

Figure 3:
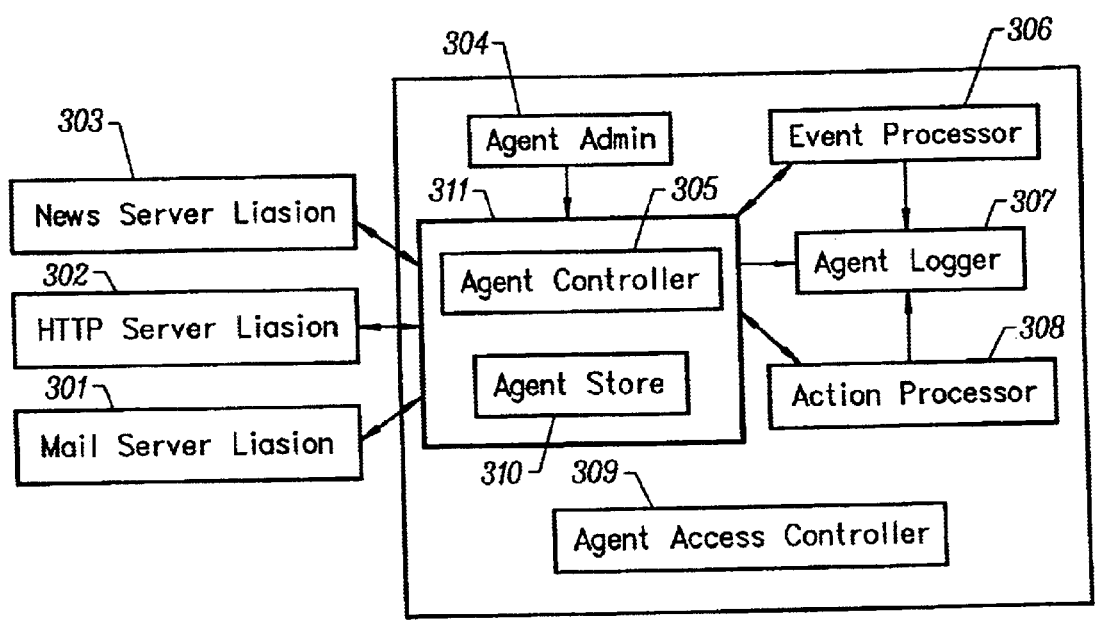
FIG. 3 is a block schematic diagram of a task-oriented view of a preferred embodiment of the invention according to the invention.

The primary design goal was to keep the agent subsystem independent of any server services. In other words, the agent subsystem should be completely decoupled from the particular type of server. This is done to ensure that agent services can be used by any Netscape (or even third party) server or any other application requiring agent services. To achieve this goal, the agent subsystem is separated into distinct, replaceable components. The high level architecture diagram is shown in FIG. 3.

Agent Controller (AC) Component 305

The AC 305 is the heart of the system. It manages all aspects of agent creation, destruction, statistics update, persistent storage, and parts of agent administration. Any program (or client) that wishes to create an agent must use the API of this component.

Every agent has a unique identification number (AgendID). Agent ids are unique within a server but not across servers. These agent ids are generated by the agent controller component.

Server and application developers who want to use agent services must program to the API of the AC 305. The HTTP Server Liaison component 301 provides the necessary UI to create and manage agents.

Agent Classes and Agent Objects

The concept of an agent class and an agent instance to control agent name space growth has been previously introduced. As an example, consider an agent (created by user John) that waits on the document http://warp/foo.htm. Assume that the agent is interested in the event "Document Checked out." The event type for checkout is 105 in this example. The combination "http://warp.foo.htm+105" is a unique token. This token identifies an agent class. At this time, there is only one instance (or object) of this agent class:

| Agent class identifier | Number of instances |
|---|---|
| http://warp.foo.htm + 105 → | 1(User John) |

Next, user Smith wishes to create an agent object to look for checkouts of http://warp.foo.htm. At this point, there is already an agent object waiting on this document for the same event type. Therefore, the agent class is already in existence and a new object of this agent class must be created:

| Agent class name | Number of instances |
|---|---|
| http://warp.foo.htm + 105 → | 2(User John, User Smith) |

Now consider the scenario where a user Jane wants to create an agent for document http://warp.foo.htm but she wants to be notified when the document is deleted (event type 106). The combination "http://warp.foo.htm+106" is another agent class name. The agent event processor 306 recognizes that this agent class doesn't exist and hence creates the agent class "http://warp.foo.htm+106" and also creates the first object of this class for user Jane.

| Agent class name | Number of instances |
|---|---|
| http://warp.foo.htm + 105 → | 2(User John, User Smith) |
| http://warp.foo.htm + 106 → | 1(User Jane) |

If another user Jack wants to be notified at "Thu Aug 15, 96 10:00 AM," another agent class is created. Assume that the timer alarm has an event type 222, then:

| Agent class name | Number of instances |
|---|---|
| http://warp.foo.htm + 105 → | 2(User John, User Smith) |
| http://warp.foo.htm + 106 → | 1(User Jane) |
| Thu Aug 15, 96 10:00 AM + 222 → | 1(User Jack) |

There can be a large number of agent objects but a much smaller number of agent classes. Every agent object has a <class name, instance number> as its unique identifier. The details are presented here just for information. Clients do not have to know anything about these details.

HTTP Server Liaison (HSL) Component 302

The primary goal of the HSL component 302 is to communicate with the HTTP server. It understands HTML, NSAPI issues, agent home page, etc. The HSL 302 provides the various UI related stuff to create agents using a Web browser. It is responsible for accepting the HTTP input and parsing it into appropriate arguments which are then passed to the AC 305. All UI and server related issues from the AC 305 are thereby isolated. It is a direct application of the Model-View-Controller (MVC) paradigm.

HSL 302 also enforces some preliminary access control issues. The HSL 302 can check if the user is authorized to access agent services based on the request coming in. Note that, in case of some servers, the HSL component 302 may not exist.

Agent Store 310

The Agent Store 310 is an internal component of the agent subsystem 311 not visible to public clients. It manages all persistent storage issues (BTree, Database, etc.). The AC 305 uses the Agent Store 310. The Agent Admin component 304 also uses the Agent Store 310.

The Agent Store 310 uses two levels of storage. The primary store is a flat file, almost fully recoverable. It stores agent objects sequentially. This is replaced by a true database when a database is used with every server.

The primary store is accessed using a hash table for speed. If the hash table is damaged, it will be discarded and a new one will be built using the primary store.

Event Processor (EP) 306

The EP component 306 manages event detection and triggering of agents. The potential set of events that can trigger an agent can be large. The agent subsystem 310 should not be limited by the event types that it understands. It should be possible for server/application developers to define new event types that trigger agents. To achieve this goal, event detection and triggering is delegated to the EP component 306.

The AC 305 does not attach any meaning to different event types. The EP 306 is responsible for understanding different event types, registering for them, detecting them, and finally triggering agents. Any event associated data passed to the AC 305 is passed on to the EP 306 transparently without any processing within the AC 305.

Only the AC 305 and the Agent Admin 304 components communicate with the EP 306. When the EP 306 detects an event, it calls the trigger function exported by the AC 305. The problem of handling multiple agents (potentially thousands) waiting on the same event is handled by the AC 305.

The EP 306 can be used for detecting document events as well as time triggered events within a HTTP server. Other servers can provide their own event processors and the agent controller will work with them without any problems.

The EP 306 need not provide agent registration/maintenance (for events) across server runs. It should only be capable of storing necessary information persistently during a server run. This is because, when the agent subsystem is initialized, the AC 305 will initiate the registration of all agent objects in the agent store with the EP 306 (AC 305 is responsible for persistency of agent objects). However, implementers of new EPs are free to adopt their own schemes.

The EP 306 also supports some admin features which are mostly used by the AC 305 and the Agent Admin 304 components.

The EP 306 and AC 305 communicate using event handles. When a new agent creation request is submitted to the AC 305, it calls on the EP 306 to process the event registration (if needed). The EP 306 returns an event handle to the AC 305. This event handle is used by the AC 305 to manage agent objects waiting on the same event (in the simplest case, the event handle could be a string of the format "http://warp.foo.htm+105"). It is the responsibility of the EP 306 to detect if there is already an agent object registered for an event, and avoid multiple registrations. This should be quite straight forward.

Steps in Creating an Agent Object

When a client request to create an agent object is received by the AC 305:

1. AC 305 passes the event information to the EP 306.
2. EP 306 builds the event handle using the event type and looks it up in its database to check if it has been already registered with the message handler.
3. If (2) is true, then the EP 306 just returns the event handle associated with this event to the AC 305.
4. If (2) is false, the EP 306 registers with the message handler for notifications on the event and then returns the event handle to AC 305.
5. AC 305 generates a new agent id for this agent object.
6. AC 305 uses the event handle to locate the list of agent objects (if any) queued on this event handle and adds the new agent object to the list and updates the agent store.
7. Finally, AC 305 returns the agent id to the client.
8. In case of agents submitted by clients using a web browser, post the information about this new agent object to the client. This will be done by the HTTP Server Liaison 302.

Action Processor (AP) 308

The AP 308 component is responsible for performing the necessary actions (send mail, POST to a page, run a program) when an agent is triggered. It is a simple component that understands different action types and knows how to perform the action.

As with event types, the AC 305 does not process action type information, even though it stores them. All data related to the action(s) of an agent are passed to the AP 308 when an agent is triggered. The AP component 308 can also be supplied by server/application writers. One implementation maintains a queue of all triggered agents and executes their actions sequentially, and informs the AC 305 when it is done processing (for every agent).

The relation between the AP 308 and AC 305 is a producer-consumer relation; the AC 305 produces triggered agents and the AP 308 consumes them. The execution of the AP 308 is independent of the execution of the EP 306 and AC 305.

The AP 308 must be very careful with security and access control issues. This is tricky with JavaScript actions.

The AP 308 can impose limits on what can be done on behalf of an agent. For example, it might restrict a JavaScript action to execute for only 2 seconds. All such decisions are left to the AP implementor.

The queue of triggered (but not processed) agents in the AP 308 need not be persistent across server runs. In case some actions are lost due to a server crash, the AC 308 can always restart its actions when the server is re-started. Again, implementers of other APs are not bound by this policy. It just makes it easier to do this way.

Steps in Agent Triggering and Action Processing

When an event is generated:
1. The EP's 306 internal callback function is called. The EP 306 now maps the event to the appropriate event handle it had generated.
2. EP 306 calls the trigger function of the AC 305 with this event handle.
3. The AC 305 uses the event handle to locate all the agent objects waiting on this event.
4. AC 305 collects all the actions that need to be executed and passes the list of actions (along with the event information) to the AP 308 in one call.
5. AP 308 stores the actions for processing and returns control to AC 305 immediately.
6. AP 308 processes the action list and informs the AC 305 when it has completed processing.
7. AC 305 updates the trigger statistics of the agent objects.

The action list can be passed to the AP 308 in memory, which would be released by AP 308 when it is done processing the actions. It is also conceivable that the actions are passed in a temporary file (when the list of actions is very large) which gets deleted when processing is done. The AC 305 is free to use any of these schemes depending on the situation. This is an internal protocol between the AP 308 and the AC 305.

Agent Logger 307

The Agent Logger component 307 is responsible for logging all necessary information to an external log file. It provides a very simple API and other components call on it with the necessary information to log as and when needed.

Agent Admin 304

The Agent Admin component 304 provides administration facilities to the agent subsystem. It allows administrators and normal users to query and retrieve (subject to ACL) information about specific agents as well as groups of agents.

The Agent Admin component 304 also allows admins to enable and disable agent services (using the Ac 305). Most of the work that is done in the Agent Admin 304 depends on the Agent Store 310.

Agent Access Controller 309

The Agent Access Controller 309 takes care of validating ACLs for any operation performed by clients. It ;is responsible for maintaining ACLs and such to validate access.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for asynchronous server-client transactions across a computer network in a computer environment, comprising the steps of:

providing agent means placed on said server for monitoring specific event(s) on said server;

wherein when said event(s) occurs, said agent means performs a set action or actions in response to said event;

providing agent templates that are the pre-defined set of agent types supported by said server; and wherein said server publishes said agent templates and events available on said server on an agent home page.

2. The process of claim 1, wherein said action or actions are pre-defined by said client.

3. The process of claim 1, wherein said agent means are placed on said server by said client and require no further intervention of said client.

4. The process of claim 1, wherein said agent means are created by a news reader and are treated as a value added service provided by the application, and wherein said agents means is then sent to said server upon said client's approval.

5. The process of claim 1, wherein said agent means monitors only the type of events specified by said server.

6. The process of claim 1, wherein said agent means perform actions that include the execution of Java and/or Javascript programs.

7. The process of claim 6, wherein said Java and/or Javascript programs are supplied by the client.

8. The process of claim 6, wherein said Java and/or Javascript programs are supplied by the server.

9. The process of claim 1, wherein said agent means are subject to the same access control security restrictions as the client that created said agent means.

10. The process of claim 1, further comprising the step of:

sending an e-mail notification from said server to said client, confirming that said agent means were received; and wherein said email notification can also be specified to be sent to a group of clients.

11. The process of claim 1, further comprising the step of:

sending an e-mail notification from said server to said client, notifying said client that an agent means has expired.

12. The process of claim 1, wherein clients select from the list of agent types available on said server and submit an agent to said server.

13. The process of claim 1, further comprising the step of:

providing administration means for allowing said client to monitor and manage said agent means.

14. The process of claim 1, wherein said server assigns a unique identifier to each agent means.

15. The process of claim 1, wherein said agent means is assigned a unique token identifier.

16. The process of claim 1, wherein said client names said agent means.

17. The process of claim 1, further comprising the step of:

providing server administration means for allowing server administrators to maintain and manage agent means resident on that server.

18. The process of claim 1, further comprising the step of:
providing agent object creation means for creating agent objects on said server.

19. The process of claim 1, further comprising the step of:
providing agent triggering means for mapping the agent means to the proper event and triggering upon occurrence of said event.

20. The process of claim 1, further comprising the step of:
providing agent processing means for processing the action list for an agent means.

21. The process of claim 1, further comprising the step of:
providing agent logging means for logging agent information and statistics.

22. An apparatus for asynchronous server-client transactions across a computer network in a computer environment, comprising:
agent means placed on said server for monitoring specific event(s) on said server;
wherein when said event(s) occurs, said agent means performs a set action or actions in response to said event;
agent templates that are the pre-defined set of agent types supported by said server; and
wherein said server publishes the different agent templates and events available on said server on an agent home page.

23. The apparatus of claim 22, wherein said action or actions are pre-defined by said client.

24. The apparatus of claim 22, wherein said agent means are placed on said server by said client and require no further intervention of said client.

25. The apparatus of claim 22, wherein said agent means are created by a news reader and are treated as a value added service provided by the application, and wherein said agents means is then sent to said server upon said client's approval.

26. The apparatus of claim 22, wherein said agent means monitors only the type of events specified by said server.

27. The apparatus of claim 22, wherein said agent means perform actions that include the execution of Java and/or Javascript programs.

28. The apparatus of claim 27, wherein said Java and/or Javascript programs are supplied by the client.

29. The apparatus of claim 27, wherein said Java and/or Javascript programs are supplied by the server.

30. The apparatus of claim 22, wherein said agent means are subject to the same access control security restrictions as the client that created said agent means.

31. The apparatus of claim 22, further comprising:
a module for sending an e-mail notification from said server to said client, confirming that said agent means were received; and
wherein said email notification can also be specified to be sent to a group of clients.

32. The apparatus of claim 22, further comprising:
a module for sending an e-mail notification from said server to said client, notifying said client that an agent means has expired.

33. The apparatus of claim 22, wherein clients select from the list of agent types available on said server and submit an agent to said server.

34. The apparatus of claim 22, further comprising:
administration means for allowing said client to monitor and manage said agent means.

35. The apparatus of claim 22, wherein said server assigns a unique identifier to each agent means.

36. The apparatus of claim 22, wherein said agent means is assigned a unique token identifier.

37. The apparatus of claim 22, wherein said client names said agent means.

38. The apparatus of claim 22, further comprising:
server administration means for allowing server administrators to maintain and manage agent means resident on that server.

39. The apparatus of claim 22, further comprising:
agent object creation means for creating agent objects on said server.

40. The apparatus of claim 22, further comprising:
agent triggering means for mapping the agent means to the proper event and triggering upon occurrence of said event.

41. The apparatus of claim 22, further comprising:
agent processing means for processing the action list for an agent means.

42. The apparatus of claim 22, further comprising:
agent logging means for logging agent information and statistics.

43. A program storage medium readable by a computer, tangibly embodying a program of instructions executable by the computer to perform method steps for asynchronous server-client transactions across a computer network in a computer environment, comprising the steps of:
providing agent means placed on said server for monitoring specific event(s) on said server;
wherein when said event(s) occurs, said agent means performs a set action or actions in response to said event;
providing agent templates that are the pre-defined set of agent types supported by said server; and
wherein said server publishes the different agent templates and events available on said server on an agent home page.

44. The method of claim 43, wherein said action or actions are pre-defined by said client.

45. The method of claim 43, wherein said agent means are placed on said server by said client and require no further intervention of said client.

46. The method of claim 43, wherein said agent means are created by a news reader and are treated as a value added service provided by the application, and wherein said agents means is then sent to said server upon said client's approval.

47. The method of claim 43, wherein said agent means monitors only the type of events specified by said server.

48. The method of claim 43, wherein said agent means perform actions that include the execution of Java and/or Javascript programs.

49. The method of claim 48, wherein said Java and/or Javascript programs are supplied by the client.

50. The method of claim 48, wherein said Java and/or Javascript programs are supplied by the server.

51. The method of claim 43, wherein said agent means are subject to the same access control security restrictions as the client that created said agent means.

52. The method of claim 43, further comprising the step of:
sending an e-mail notification from said server to said client, confirming that said agent means were received; and
wherein said email notification can also be specified to be sent to a group of clients.

53. The method of claim 43, further comprising the step of:

sending an e-mail notification from said server to said client, notifying said client that an agent means has expired.

54. The method of claim 43, wherein clients select from the list of agent types available on said server and submit an agent to said server.

55. The method of claim 43, further comprising the step of:

providing administration means for allowing said client to monitor and manage said agent means.

56. The method of claim 43, wherein said server assigns a unique identifier to each agent means.

57. The method of claim 43, wherein said agent means is assigned a unique token identifier.

58. The method of claim 43, wherein said client names said agent means.

59. The method of claim 43, further comprising the step of:

providing server administration means for allowing server administrators to maintain and manage agent means resident on that server.

60. The method of claim 43, further comprising the step of:

providing agent object creation means for creating agent objects on said server.

61. The method of claim 43, further comprising the step of:

providing agent triggering means for mapping the agent means to the proper event and triggering upon occurrence of said event.

62. The method of claim 43, further comprising the step of:

providing agent processing means for processing the action list for an agent means.

63. The method of claim 43, further comprising the step of:

providing agent logging means for logging agent information and statistics.

* * * * *